(12) United States Patent
Fainstain et al.

(10) Patent No.: US 11,381,825 B2
(45) Date of Patent: Jul. 5, 2022

(54) VARIABLE RATE RENDERING BASED ON MOTION ESTIMATION

(71) Applicant: ADVANCED MICRO DEVICES, INC., Santa Clara, CA (US)

(72) Inventors: Evgene Fainstain, Santa Clara, CA (US); Scott A. Wasson, Kansas City, MO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/201,918

(22) Filed: Nov. 27, 2018

(65) Prior Publication Data

US 2020/0169734 A1 May 28, 2020

(51) Int. Cl.
*H04N 19/139* (2014.01)
*H04N 19/146* (2014.01)
*G06T 13/20* (2011.01)
*H04N 19/523* (2014.01)
*H04N 19/119* (2014.01)
*H04N 19/182* (2014.01)
*H04N 19/172* (2014.01)
*G06T 7/90* (2017.01)

(52) U.S. Cl.
CPC .......... *H04N 19/139* (2014.11); *G06T 7/90* (2017.01); *G06T 13/20* (2013.01); *H04N 19/119* (2014.11); *H04N 19/146* (2014.11); *H04N 19/172* (2014.11); *H04N 19/182* (2014.11); *H04N 19/523* (2014.11)

(58) Field of Classification Search
None
See application file for complete search history.

(56) References Cited

U.S. PATENT DOCUMENTS

| | | | |
|---|---|---|---|
| 6,512,537 B1 * | 1/2003 | Shimizu | G08B 13/19602 348/152 |
| 10,169,843 B1 | 1/2019 | Amer et al. | |
| 10,609,440 B1 * | 3/2020 | Wu | H04N 19/65 |
| 2008/0247465 A1 * | 10/2008 | Xin | H04N 19/56 375/240.16 |
| 2014/0219354 A1 * | 8/2014 | Yedidi | H04N 19/139 375/240.16 |
| 2016/0150235 A1 * | 5/2016 | Schulze | H04N 19/132 375/240.02 |
| 2017/0094274 A1 * | 3/2017 | Chien | H04N 19/124 |
| 2017/0347107 A1 * | 11/2017 | Teng | H04N 19/176 |
| 2019/0104312 A1 * | 4/2019 | Lim | H04N 19/503 |

* cited by examiner

*Primary Examiner* — Edemio Navas, Jr.

(57) ABSTRACT

A rendering processor assigns varying logical pixel dimensions to regions of an image frame and rendering pixels of the image frame based on the logical pixel dimensions. The rendering processor renders in highest resolution (i.e., with smaller logical pixel dimensions) those areas of the image that are more important (on which the viewer is expected to focus (the "foveal region"), or regions with little-to-no motion), and renders in lower resolution (i.e., with larger logical pixel dimensions) those areas of the image outside the region of interest, or regions that are speedily moving, so that loss of detail in those regions will be less noticeable to the viewer. For regions with less detail or greater magnitude of motion, larger logical pixel dimensions reduce the computational workload without affecting the quality of the displayed graphics as perceived by a user.

20 Claims, 5 Drawing Sheets

VARIABLE RATE RENDERING BASED ON MOTION ESTIMATION

BACKGROUND

Computer graphics or image rendering is the process by which a computing system displays an image based on a computer program. A scene file containing information regarding objects in a scene is passed to one or more processing units that render an image (also referred to herein as a "frame" or "image frame") for display based on the scene file. A display contains an array of pixels, each of which is the smallest addressable element in the display device. However, three-dimensional rendered animations often contain extraneous detail that a viewer cannot perceive. Further, rendering each pixel of a display to generate a high-resolution image is computationally intensive.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
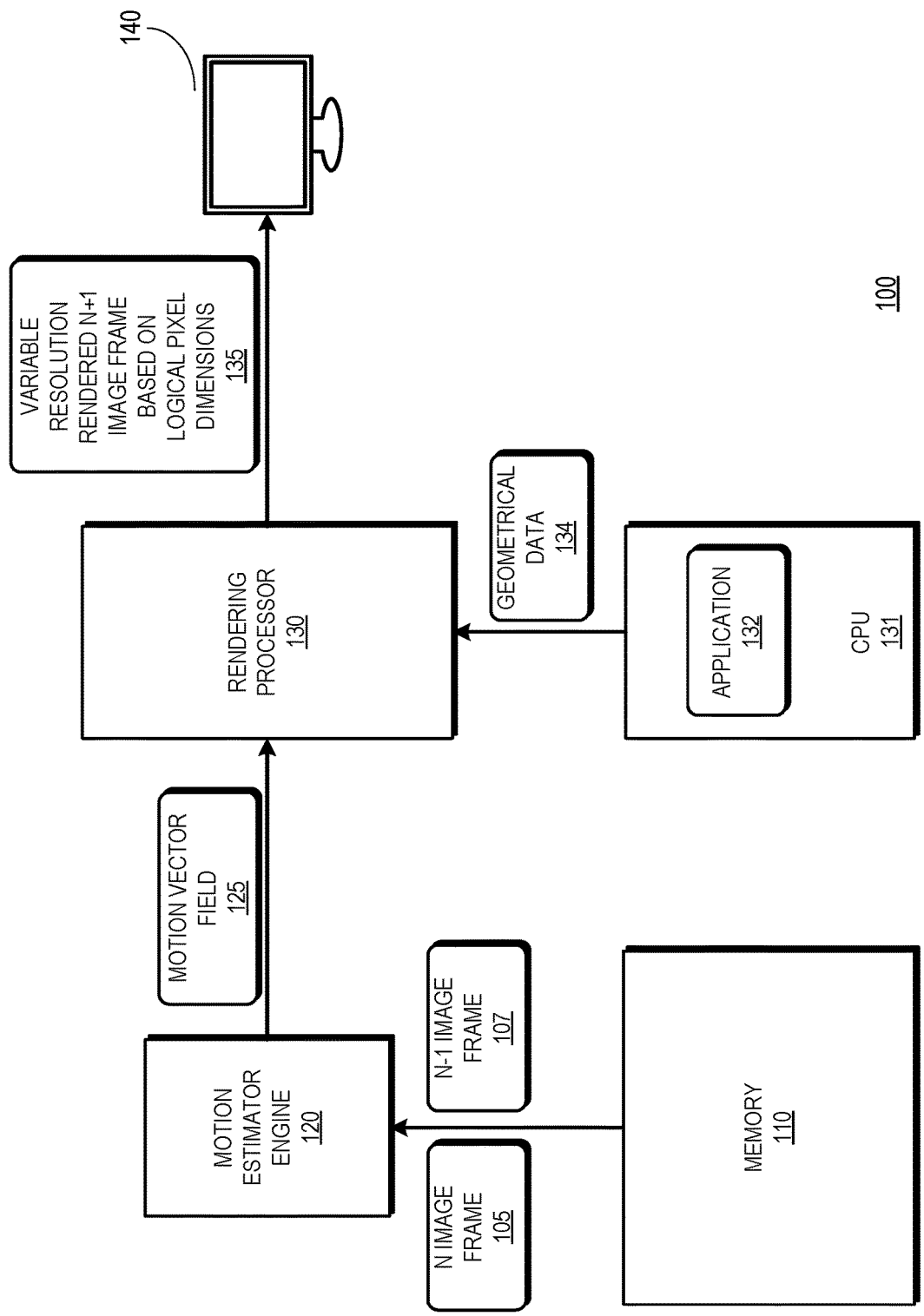
FIG. 1 is a block diagram of a processing system that includes a motion estimator engine to generate a motion vector field for rendering regions of an image frame at variable resolutions based on the presence of objects and at least one of a magnitude and direction of motion according to some embodiments.

Variable resolution rendering can be used to reduce the computational workload on a processing system rendering relatively complex graphics (e.g., real-time 3D graphics animation) by assigning varying logical pixel dimensions to regions of an image frame and rendering pixels of the image frame based on the logical pixel dimensions. By identifying which regions of an image are of interest to a viewer, it is possible to render in highest resolution (i.e., with smaller logical pixel dimensions) those areas of the image on which the viewer is expected to focus (the "foveal region"), and to render in lower resolution (i.e., with larger logical pixel dimensions) those areas of the image outside the region of interest so that they will be less noticeable to the viewer. For regions with less detail or greater magnitude of motion, larger logical pixel dimensions reduce the computational workload without affecting the quality of the displayed graphics as perceived by a user.

For example, in some embodiments a processing system uses a motion estimator engine to divide a previously rendered image into regions, referred to herein as "tiles", of one or more pixels, sub-pixels, or fragments, and generate a motion vector field or other motion data identifying those tiles having moving areas. The processing system receives geometrical data from an application executing at a central processing unit, wherein the geometrical data identify those tiles having objects. The processing system uses the rendering processor to identify those tiles having little to no motion, based on the motion vector field, and having objects, and to assign smaller logical pixel dimensions in these regions. The rendering processor assigns logical pixel dimensions for each tile based on at least one of a magnitude and direction of motion within the tile. For example, if the motion estimator engine identifies that a tile has a motion vector indicating left to right motion, the rendering processor will assign logical pixel dimensions in that tile that are larger along the horizontal axis than along the vertical axis, reducing the effective rendering resolution within that tile to less than the nominal rate along the horizontal axis. In some embodiments, the presence of an object or portion of an object in a tile overrides the presence of motion in a tile for purposes of assigning logical pixel dimensions, such that the rendering processor assigns smaller logical pixel dimensions to tiles containing objects or portions of objects, even if the tiles also have motion. In some embodiments, whether the presence of an object overrides the presence of motion, or vice versa, is configurable. In this way, the rendering processor avoids a perceptible reduction in visual quality.

In some embodiments, the motion estimator engine generates motion information for a frame based on user input data, the geometrical buildup of the frame (i.e., the data which will define the frame), and other inputs. In some embodiments, the motion estimator engine examines the two most-recently fully-rendered image frames (referred to as the "N" and "N−1" image frames) to create a motion vector field that measures the motion of the previous two image frames. The motion estimator engine compares each tile, or block, of the N and N−1 image frames to determine motion vectors for each block. A block is a uniform size of a group of pixels used for block-based motion estimation. In some embodiments, a motion estimator engine that is not block-based generates motion vectors per pixel, or per a group of multiple pixels. Based on an analysis of the N and N−1 image frames, the motion estimator engine generates a motion vector field, which indicates areas, magnitude, and direction of motion between the previous two image frames.

If the N and N−1 image frames correlate sufficiently to conclude that the N image frame is a continuation of the N−1 image frame that immediately preceded it, the rendering processor assumes that the motion vector field is valid (e.g., there was no scene change) and that the units of the next image frame (referred to as the "N+1" image frame) will continue along the same trajectory. The rendering processor receives geometric and color data from the application and identifies which groups of pixels of the N image frame contain objects or skin color, and it may calculate other relevant metrics. Based on one or more of the motion vector fields, the objects, color, and the other relevant metrics, the rendering processor assigns logical pixel dimensions for each tile. In some embodiments, the tiles form a uniform or non-uniform grid of blocks of multiple pixels. The sizes of the tiles need not be correlated to sizes of units used by the underlying metrics. The rendering processor assigns smaller logical pixel dimensions (e.g., 1×1 pixel or 0.5×0.5 pixels, in which case the logical pixel dimensions contain multiple fragments or sub-pixels) for tiles having little or no motion, objects, and/or skin color, or in which both stationary and in-motion objects are present. The rendering processor assigns larger logical pixel dimensions (e.g., 2×1, 1×2, 2×2, 4×4, 2×4, 4×2) for tiles having a larger magnitude of motion vector, or no objects or skin color. The rendering processor also assigns larger logical pixel dimensions for tiles having a large degree of change between corresponding tiles of the N and N−1 image frames (such as for an explosion) and for tiles having a gradient of an image (such as a clear sky). In some embodiments, the rendering processor balances the variable resolution rates (i.e. logical pixel sizes) of tiles of an image frame based on a frame rate requirement for an application executing at the CPU or other performance requirements.

Once the rendering processor has assigned logical pixel dimensions for each of the tiles of the N+1 frame, the rendering processor renders the pixels of the N+1 frame based on the logical pixel dimensions. If a logical pixel dimension is larger than one pixel, the rendering processor renders pixels of the logical pixel with the pixel value of the geometric center of the logical pixel. The rendering processor then assigns logical pixel dimensions for the next frame, such that the logical pixel dimensions of each tile are dynamically re-assigned for each frame. In this way, the variable resolution of each tile of each frame is adapted in real time, so that, e.g., regions with reduced rendering detail will return to full resolution when movement in those regions slows or stops.

FIG. 1 is a block diagram of a processing system 100 that includes a motion estimator engine 120 to generate a motion vector field 125 and a rendering processor 130 for rendering a variable resolution image frame 135 based on logical pixel dimensions that are assigned based on a direction and magnitude of motion and the presence of objects in each tile according to some embodiments. The processing system 100 can be incorporated in any of a variety of electronic devices, such as a server, personal computer, tablet, set top box, gaming system, and the like. The motion estimator engine 120 is coupled to a memory 110 and the rendering processor 130, which provides the variable resolution rendered image frame based on logical pixel dimensions 135 to a display 140. The rendering processor 130 executes instructions and stores information in the memory 110 such as the results of the executed instructions. For example, the memory 110 stores a plurality of previously-rendered images (not shown) that it receives from the rendering processor 130. In some embodiments, the memory 110 is implemented as a dynamic random access memory (DRAM), and in some embodiments, the memory 110 is implemented using other types of memory including static random access memory (SRAM), non-volatile RAM, and the like. Some embodiments of the processing system 100 include an input/output (I/O) engine (not shown) for handling input or output operations associated with the display 140, as well as other elements of the processing system 100 such as keyboards, mice, printers, external disks, and the like.

The motion estimator engine 120 is configured to receive memory locations for a most recently rendered image (the N image) 105 and a second-most recently rendered image (the N−1 image) 107 from a central processing unit (CPU) (not shown). The motion estimator engine 120 compares the sequential previously-rendered images 105 and 107 stored at the memory 110 to generate the motion vector field 125.

The rendering processor 130 receives commands generated by a central processing unit (CPU) 131 based on an application 132 instructing the rendering processor 130 to render a current (N+1) image (not shown). Some embodiments of the rendering processor 130 include multiple processor cores (not shown in the interest of clarity) that independently execute instructions concurrently or in parallel. Some embodiments of a command generated by the CPU include information defining textures, states, shaders, rendering objects, buffers, and the like that are used by the rendering processor 130 to render the objects or portions thereof in the N+1 image. The rendering processor 130 renders the objects to produce values of pixels that are provided to the display 140, which uses the pixel values to display an image that represents the rendered objects.

To facilitate more efficient rendering of images, the rendering processor 130 identifies objects in the N+1 image frame based on geometric data 134 provided by the application 132 and assigns logical pixel dimensions for each tile of the N+1 image frame based on the identified objects and the motion vector field 125. The rendering processor 130 renders the N+1 image based on the logical pixel dimensions such that tiles having logical pixel dimensions greater than 1×1 pixel are rendered at lower resolution than tiles having logical pixel dimensions of 1×1 pixel or smaller. Further, because the logical pixel dimensions are larger along an axis corresponding to a direction of motion for each tile, tiles are rendered at lower resolution along a direction of motion. The reduction in resolution conserves rendering processor resources without degrading the user-perceivable image quality.

In operation, the motion estimator engine 120 receives the memory locations of the N and N−1 images 105 and 107 from the CPU 131. The motion estimator engine 120 analyzes at least the N and N−1 images 105 and 107 stored at the memory 110 to generate a motion vector field 125 that estimates moving areas of the N+1 image (not shown). The motion vector field 125 indicates the direction and/or magnitude of motion for each unit of the image. The motion estimator engine 120 provides the motion vector field 125 to the rendering processor 130.

The rendering processor 130 receives the motion vector field 125 from the motion estimator engine 120, and also receives geometric data 134 from the application 132 to identify objects in the N+1 image. In some embodiments, the rendering processor monitors WorldViewMatrix or ObjectTransformMatrix on a per-object basis to know the motion per object. Based on the identified objects and movement indicated by the motion vector field 125, the rendering processor 130 assigns logical pixel dimensions for each tile of the N+1 image. In some embodiments, the logical pixel dimensions are greater than one pixel along an axis corresponding to a direction of motion indicated by the motion vector field 125 if the magnitude of the motion vector is greater than a threshold value. In some embodiments, the logical pixel dimensions are greater than one pixel for tiles having a degree of change in pixel values between the N and N−1 images greater than a threshold value. In some embodiments, logical pixel dimensions are greater than one pixel for tiles forming a gradient of the image (e.g. a clear sky). In some embodiments, the logical pixel dimensions for a tile are smaller than one pixel for tiles containing objects, a magnitude of motion vector smaller than a threshold value, skin color, or a high degree of detail.

The rendering processor 130 renders the N+1 image based on the logical pixel dimensions. Thus, the rendering processor 130 renders the pixels of each of the logical pixels for a tile having logical pixel dimensions that are greater than 1×1 pixel using the same value. For example, if a logical pixel size for a tile is 2×2, the rendering processor 130 renders all four of the pixels of each logical pixel for that tile using the value of the geometric center of the logical pixel. Similarly, if the logical pixel dimensions of a tile are 2×1, the rendering processor 130 renders both of the pixels of each logical pixel for that tile using the value of the geometric center of the logical pixel. The rendering processor 130 provides the variable resolution rendered image frame 135 based on the logical pixel dimensions to the display 140, which uses the pixel values of the variable resolution rendered image 135 to display an image that represents the N+1 image. The rendering processor 130 also provides a copy of the variable resolution rendered image 135 to the memory 110, where it is stored for subsequent generation of a variable resolution version of the next image or for additional, intermediate rendering stages.

Figure 2:
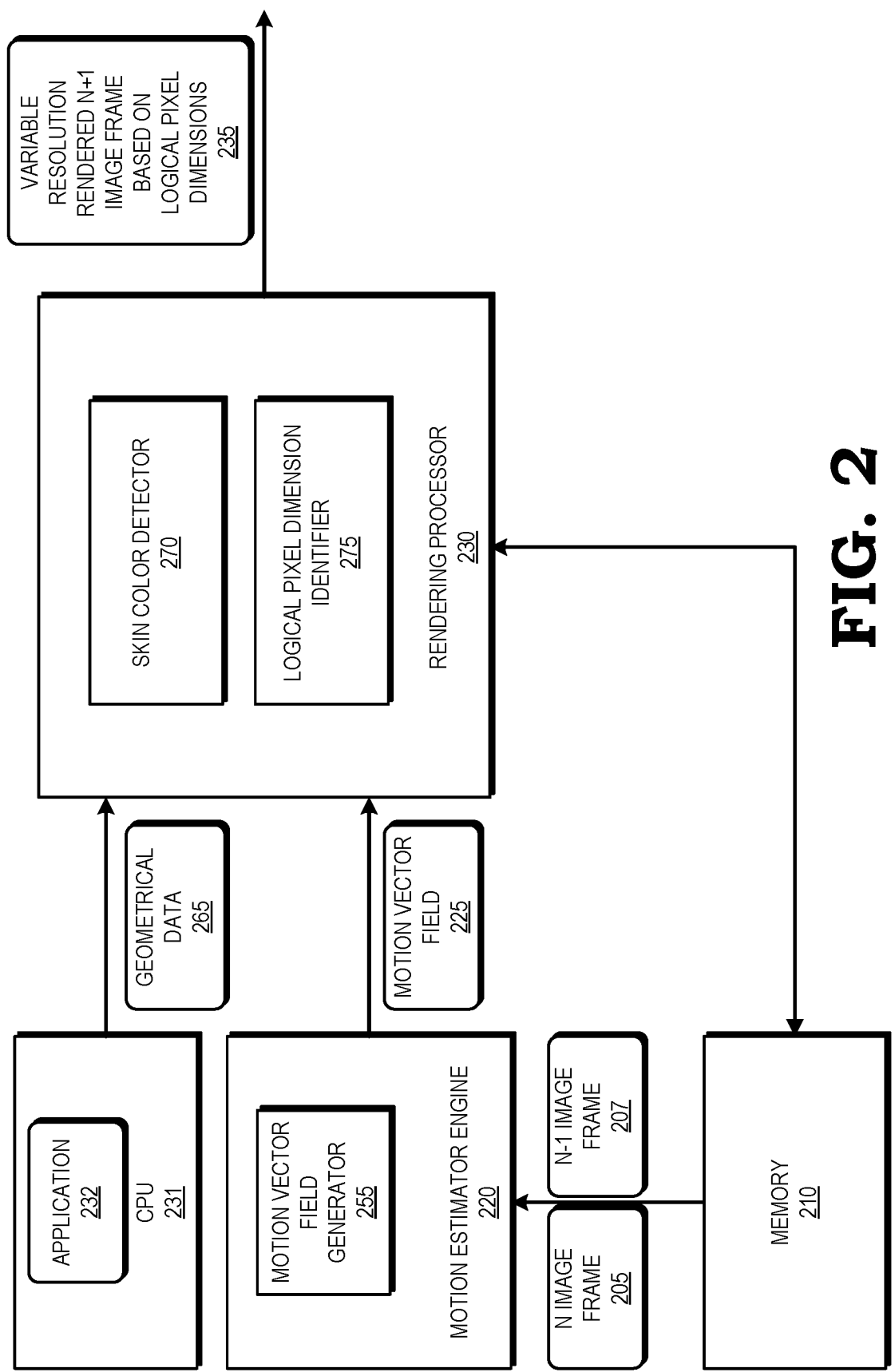
FIG. 2 is a block diagram of the motion estimator engine and rendering processor of FIG. 1 according to some embodiments.

FIG. 2 is a block diagram of a motion estimator engine 220 and rendering processor 230 of the processing system 100 of FIG. 1 according to some embodiments. The motion estimator engine 220 outputs a motion vector field 225, which is used by the rendering processor 230 to generate a variable resolution rendered N+1 image 235 based on logical pixel dimensions.

The motion estimator engine 220 is configured to generate a motion vector field 225 based on estimates of motion derived from a comparison of a previously-rendered N image 205 and N−1 image 207 stored at a memory 210. The motion estimator engine 220 includes a motion vector field generator 255. The motion vector field generator 255 is configured to estimate movement of objects in consecutive images. Motion estimation assumes that in most cases consecutive images will be similar except for changes caused by objects moving within the images. To estimate motion, the motion vector field generator 255 determines motion vectors that describe the transformation from one two-dimensional image to another from adjacent images of an image sequence. A motion vector is a two-dimensional vector that provides an offset from the coordinates in one image to the coordinates in another image.

The motion vector field generator 255 compares corresponding pixels of the N image 205 (the most recently rendered image) and the N−1 image 207 (the image rendered immediately prior to the N image) to create a motion vector field 225 that models the movement of objects between the two images. In some embodiments, the motion vector field generator 255 employs a block matching algorithm such as exhaustive search, three step search, simple and efficient search, four step search, diamond search, or other algorithms used in block matching. In some embodiments, the motion vector field generator 255 uses a neural network to estimate the motion vector field for the current frame based on the motion vector field for the previous frame.

The rendering processor 230 includes a skin color detector 270 and a logical pixel dimension identifier 275. In some embodiments, the skin color detector 270 and logical pixel dimension identifier 275 are implemented as shader programs on the rendering processor 230. In some embodiments, one or more of the skin color detector 270 and logical pixel dimension identifier 275 are implemented as fixed function hardware in the motion estimator engine 220. The rendering processor 230 is configured to receive geometrical data 265 from an application 232 executing at a CPU 231 and the motion vector field 225 generated by the motion vector field generator 255 of the motion estimator engine 220.

The skin color detector 270 is configured to detect human skin colors in tiles of the image frame. Because human skin colors are likely to correspond to regions of interest, those tiles of the image that the skin color detector 270 identifies as containing human skin colors are assigned smaller logical pixel dimensions such that they will be rendered at higher resolution, as described herein.

The logical pixel dimension identifier 275 is configured to assign logical pixel dimensions for each tile of the N+1 image frame. The logical pixel dimension identifier 275 assigns the logical pixel dimensions based on the motion vector field 225, objects identified based on the geometrical data 265, and human skin colors detected by the skin color detector 270. The logical pixel dimension identifier 275 assigns smaller logical pixel dimensions to those tiles of the N+1 image frame identified as containing objects, little to no motion, and/or human skin color. The logical pixel dimension identifier 275 assigns larger logical pixel dimensions to those tiles of the N+1 image frame identified as containing a greater magnitude of motion and/or a gradient of an image, such as a clear sky. For tiles of the N+1 image frame identified as containing a greater magnitude of motion, the logical pixel dimension identifier 275 assigns a larger logical pixel dimension to an axis of the logical pixel corresponding to the direction of motion. Thus, for example, if the motion vector field 225 indicates downward motion for a tile of the N+1 image frame, the logical pixel dimension identifier 275 assigns are larger logical pixel dimension for logical pixels of that tile along the vertical axis (e.g., 1×2 or 1×4 or 2×4 pixels).

The rendering processor 230 is configured to render the N+1 image at a variable resolution based on the logical pixel dimensions of each tile. In some embodiments, the rendering processor 230 includes a plurality of shaders (not shown), each of which is a processing element configured to perform specialized calculations and execute certain instructions for rendering computer graphics. For example, in some embodiments, the shaders compute color and other attributes for the pixels included in each logical pixel of a display. In some embodiments, the shaders of the rendering processor 230 are two-dimensional (2D) shaders such as pixel shaders, or three-dimensional shaders such as vertex shaders, geometry shaders, or tessellation shaders, or any combination thereof. In some embodiments, the shaders work in parallel to execute the operations required to render the N+1 image.

Figure 3:
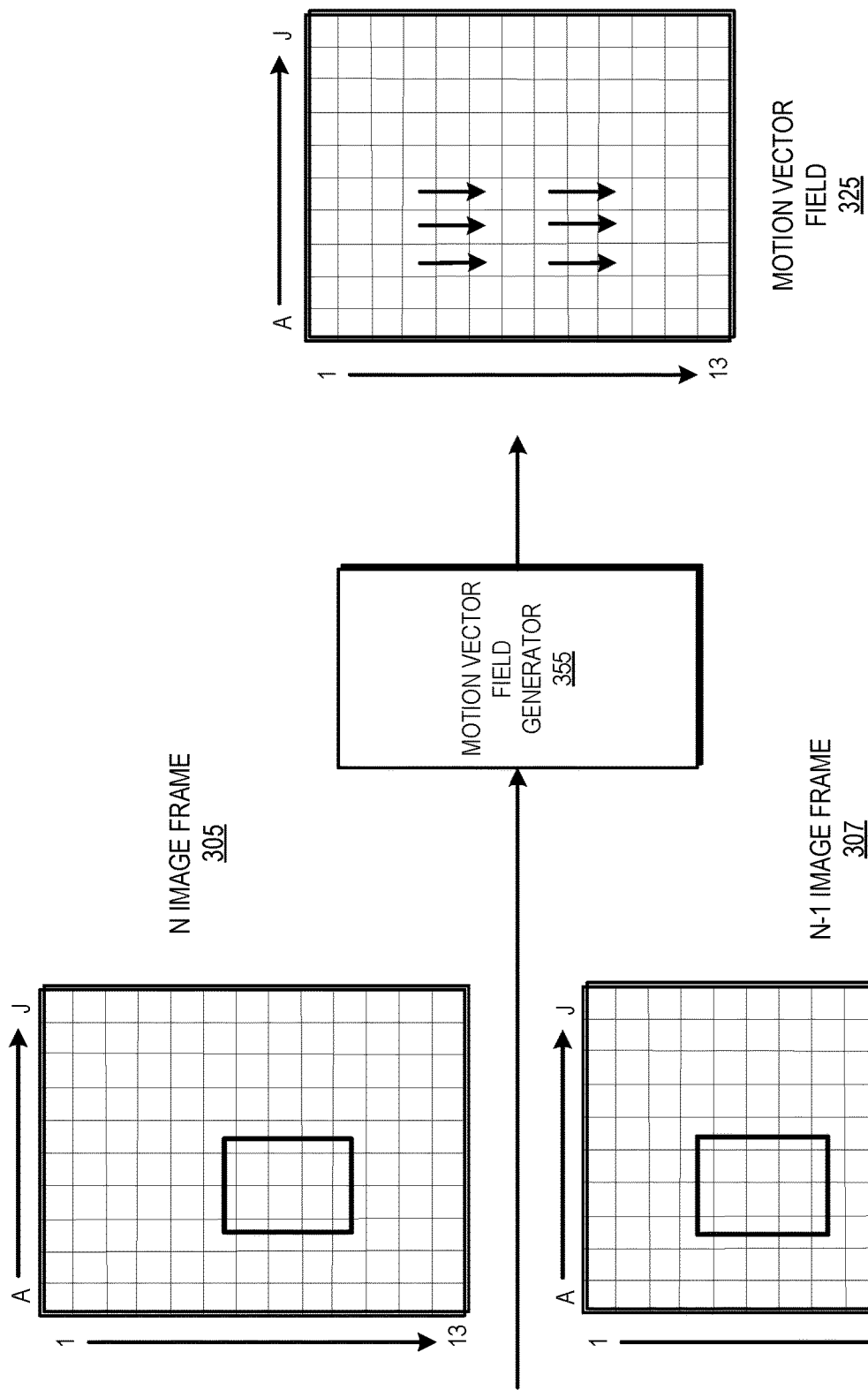
FIG. 3 is a block diagram of a motion vector field generator of the motion estimator engine of FIG. 2 according to some embodiments.

FIG. 3 is a block diagram of a motion vector field generator 355 of the motion estimator engine 220 of FIG. 2 according to some embodiments. The motion vector field generator 355 compares corresponding units, or groups of pixels, of the N image 315 and the N−1 image 317 to create a motion vector field 325 of vectors that model the movement of an object from one unit to another across consecutive images. The motion vector field generator 355 may employ a block matching algorithm such as exhaustive search, three step search, simple and efficient search, four step search, diamond search, or other algorithms used in block matching. In the example illustrated in FIG. 3, the motion vector field generator 355 generates a motion vector field 325 containing motion vectors indicating motion, e.g., from unit C4 to unit C6, from unit D4 to unit D6, from unit E4 to unit E6, from unit C8 to unit C10, from unit D8 to unit D10, and from unit E8 to unit E10.

Figure 4:
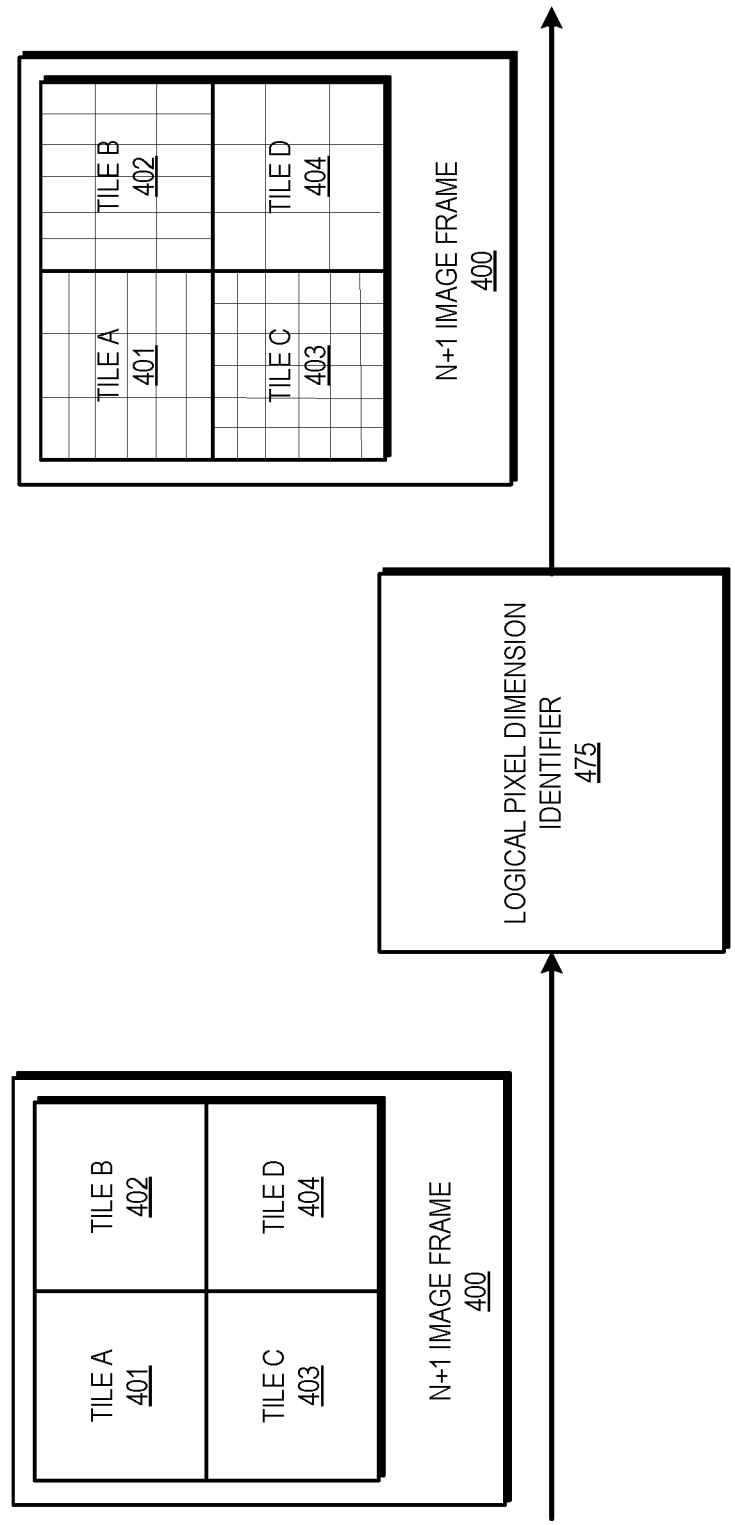
FIG. 4 is a block diagram of a logical pixel dimension identifier of the rendering processor of FIG. 2 according to some embodiments.

FIG. 4 is a block diagram of a logical pixel dimension identifier 475 of the rendering processor 230 of FIG. 2 according to some embodiments. The logical pixel dimension identifier 475 assigns logical pixel dimensions to each tile (tile A 401, tile B 402, tile C 403, and tile D 404) of a frame N+1 400. In some embodiments, the tiles analyzed by the logical pixel dimension identifier 475 are the same groups of pixels that are analyzed by the motion vector field generator 355. In some embodiments, the tiles analyzed by the logical pixel dimension identifier 475 are larger or smaller groups of pixels than the units that are analyzed by the motion vector field generator 355. The logical pixel dimension identifier 475 analyzes the motion vector field (not shown), geometric data received from the application executing at the CPU (not shown), and human skin colors detected in the N+1 image frame 400 to assign logical pixel dimensions to each tile of the N+1 image frame 400.

In the depicted example, the logical pixel dimension identifier 475 identifies the following properties of each of the tiles of the N+1 image frame 400: tile A 401 has motion in a horizontal direction, tile B 402 has motion in a vertical direction, tile C 403 has an object or human skin color, and tile D 404 has non-directional motion (e.g. explosion or expansion/contraction) or diagonal motion and/or is a gradient of the N+1 image frame such as a clear sky. Based on the identified areas of interest, the logical pixel dimension identifier 475 assigns a logical pixel size of 2×1 pixels to tile A 401, a logical pixel size of 1×2 pixels to tile B 402, a logical pixel size of 1×1 pixels to tile C 403, and a logical pixel size of 2×2 pixels to tile D 404. Based on the logical pixel dimensions, the rendering processor (not shown) will render tile A 401 with higher resolution along the vertical axis and lower resolution along the horizontal axis, tile B 402 with a lower resolution along the vertical axis and a higher resolution along the horizontal axis, tile C 403 with a higher resolution along both the vertical and horizontal axes, and tile D 404 with a lower resolution along both the vertical and horizontal axes.

Figure 5:
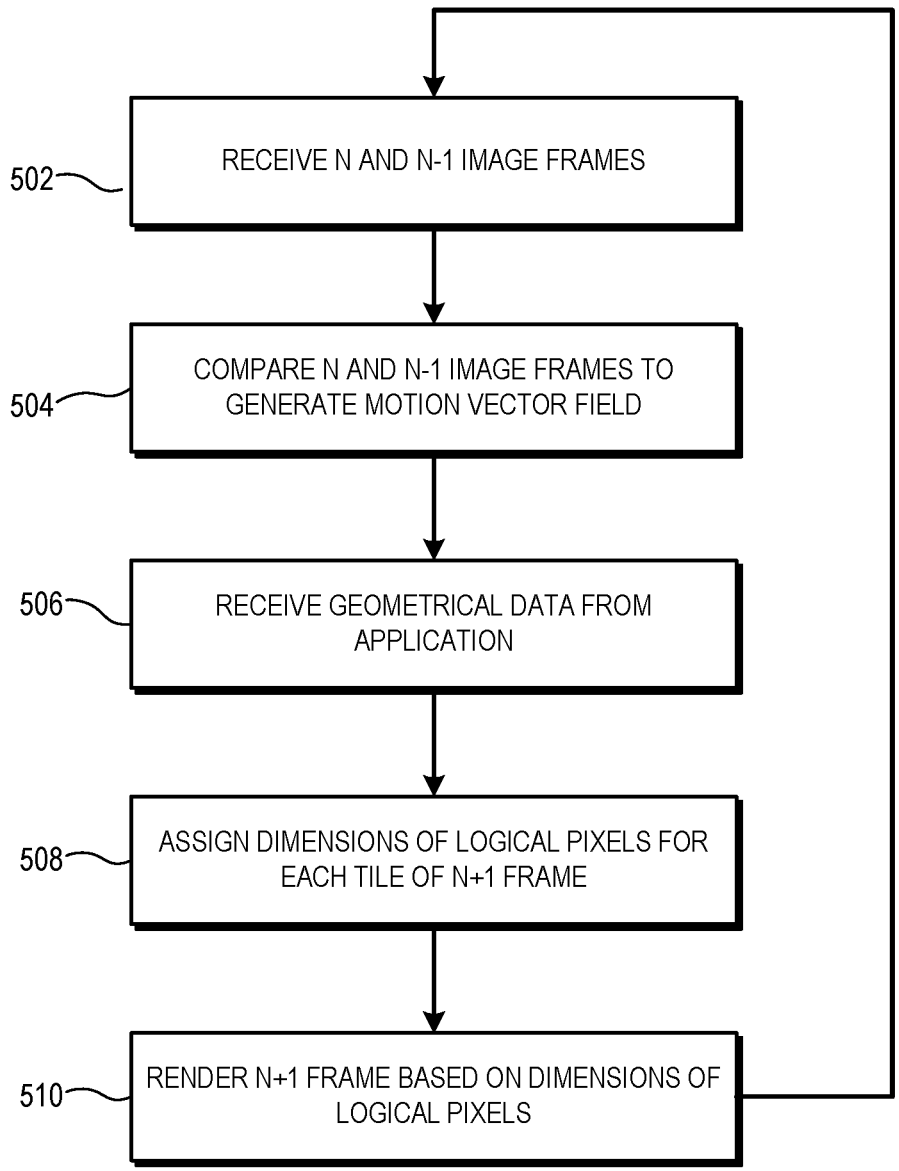
FIG. 5 is a flow diagram illustrating a method for rendering regions of an image frame at variable resolutions based on a motion vector field and the presence of objects according to some embodiments.

FIG. 5 is a flow diagram illustrating a method 500 for rendering regions of an image frame at variable resolutions based on a motion vector field and the presence of objects according to some embodiments. The method 500 is implemented in some embodiments of the processing system 100 shown in FIG. 1 and the motion estimator engine 220 and rendering processor 230 shown in FIG. 2.

At block 502, the motion estimator engine 220 receives the two most recently rendered (N and N−1) images. At block 504, the motion vector field generator 255 of the motion estimator engine 220 compares the N and N−1 images to generate a motion vector field 225. In some embodiments, the motion vector field generator 255 uses a neural network or other predictive algorithm to extrapolate the motion of the motion vector field of the N image to the motion vector field of the N+1 image frame. At block 506, the rendering processor 230 receives geometrical data 265 from the application 232 executing at the CPU 231, from which the rendering processor 230 detects the presence of objects in tiles of the N+1 image frame. At block 508, the logical pixel dimension identifier 275 assigns logical pixel dimensions for each tile of the N+1 image frame, based on the motion vector field 225, the geometrical data 265, and the presence of human skin colors. The logical pixel dimension identifier 275 assigns logical pixel dimensions such that tiles of the N+1 image that are estimated to contain objects or human skin colors or areas of little or no motion have smaller logical pixel dimensions than tiles that are estimated to contain greater magnitudes of motion or no objects. At block 510, the rendering processor 230 renders the N+1 image based on the dimensions of the logical pixels of each tile, rendering the pixels of each logical pixel using the pixel value of the geometrical center of the logical pixel. The method flow then continues back to block 502 for the next image frame.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium, in one embodiment, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are implemented, for example, in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above about specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   estimating a motion vector for each of a plurality of tiles of a first frame, each tile of the plurality of tiles comprising a plurality of pixels, sub-pixels, or fragments;
   assigning dimensions of logical pixels for each tile of the first frame, the logical pixel dimensions based on a magnitude and direction of the motion vector for each tile; and
   applying a rendering resolution for each of the plurality of tiles by rendering the pixels of each tile of the first frame based on the logical pixel dimensions for each tile, wherein rendering the pixels of a logical pixel having dimensions greater than one pixel comprises using the same value for each of the pixels of the logical pixel.

2. The method of claim 1, further comprising:
   identifying objects in the first frame based on geometrical data provided by an application; and
   wherein the logical pixel dimensions are based on the objects.

3. The method of claim 1, wherein rendering comprises rendering the logical pixels of each tile based on a value of a geometrical center of each logical pixel.

4. The method of claim 1, wherein assigning comprises assigning a dimension of logical pixels that is larger than one pixel along a direction of motion for a tile having a motion vector larger than a threshold value.

5. The method of claim 1, wherein assigning comprises assigning a dimension of logical pixels that is smaller than one pixel along a direction of motion for a tile having a motion vector smaller than a threshold value.

6. The method of claim 1, further comprising:
   estimating magnitudes of differences in pixel values for each corresponding tile of the first frame, a second frame and a third frame, the second frame immediately preceding the first frame in a sequence of rendered frames and the third frame immediately preceding the second frame in the sequence of rendered frames; and
   wherein assigning comprises assigning a dimension of logical pixels for each tile based on the magnitudes of differences in pixel values.

7. The method of claim 1, wherein assigning comprises assigning a dimension of logical pixels based on a presence of skin color within each tile.

8. The method of claim 1, wherein the logical pixel dimensions are further based on a frame rate requirement for an application executing at a processing unit of a processing system.

9. A method, comprising:
   identifying objects in a first frame based on geometrical data provided by an application;
   assigning dimensions of logical pixels of each tile of a plurality of tiles of the first frame based on whether an object or portion of an object is present in each tile, wherein each tile of the plurality of tiles comprises a group of one or more pixels, sub-pixels, or fragments; and
   applying a rendering resolution for each tile of the plurality of tiles by rendering the pixels of each tile of the first frame based on the dimensions of the logical pixels of each tile, wherein rendering the pixels of a logical pixel having dimensions greater than one pixel comprises using the same value for each of the pixels of the logical pixel.

10. The method of claim 9, further comprising:
    generating a motion vector field comprising a motion vector for each tile of the first frame based on a comparison between corresponding tiles of a second frame immediately preceding the first frame in a sequence of rendered frames and a third frame immediately preceding the second frame in the sequence of rendered frames; and
    assigning dimensions of logical pixels further based on at least one of a magnitude and direction of a motion vector for each tile.

11. The method of claim 10, wherein assigning comprises assigning a dimension of logical pixels that is larger than one pixel along a direction of motion for a tile having a motion vector larger than a threshold value.

12. The method of claim 10, wherein assigning comprises assigning a dimension of logical pixels that is smaller than one pixel along a direction of motion for a tile having a motion vector smaller than a threshold value.

13. The method of claim 10, further comprising:
    estimating magnitudes of differences in pixel values for each corresponding tile of the first, second, and third frames; and
    wherein assigning comprises assigning a dimension of logical pixels for each tile based on the magnitudes of differences in pixel values.

14. The method of claim 9, wherein rendering comprises rendering the logical pixels of each tile based on a value of a geometrical center of each logical pixel.

15. A device, comprising:
    a rendering processor configured to:
      assign dimensions of logical pixels of each tile of a plurality of tiles of a first frame based on whether an object or portion of an object is present in each tile, wherein each tile of the plurality of tiles comprises one or more pixels, sub-pixels, or fragments; and
      apply a rendering resolution for each tile of the plurality of tiles by rendering the pixels of each tile of the first frame based on the logical pixel dimensions of each tile, wherein rendering the pixels of a logical pixel having dimensions greater than one pixel comprises using the same value for each of the pixels of the logical pixel.

16. The device of claim 15, further comprising:
    a motion estimator engine configured to generate a motion vector field comprising a motion vector for each tile of the first frame, the motion vectors based on a comparison between corresponding tiles of a second frame immediately preceding the first frame in a sequence of rendered frames and a third frame immediately preceding the second frame in the sequence of rendered frames; and
    wherein the rendering processor is to assign dimensions of logical pixels of each tile further based on at least one of a magnitude and direction of the motion vector for each tile.

17. The device of claim 16, wherein the rendering processor is further configured to assign a dimension of logical pixels that is larger than one pixel along a direction of motion for a tile having a motion vector larger than a threshold value.

18. The device of claim 16, wherein the rendering processor is further configured to assign a dimension of logical pixels that is smaller than one pixel along a direction of motion for a tile having a motion vector smaller than a threshold value.

19. The device of claim 16, wherein the motion estimator engine is further to:
  estimate magnitudes of differences in pixel values for each corresponding tile of the first, second, and third frames; and
  wherein the rendering processor is further to assign a dimension of logical pixels for each tile based on the magnitudes of differences in pixel values.

20. The device of claim 15, wherein the rendering processor is further configured to render the logical pixels of each tile based on a value of a geometrical center of each logical pixel.

\* \* \* \* \*